Aug. 9, 1955 S. RUBIN 2,714,950
AUTOMATIC FEEDING DEVICE
Filed Sept. 4, 1952 5 Sheets-Sheet 1
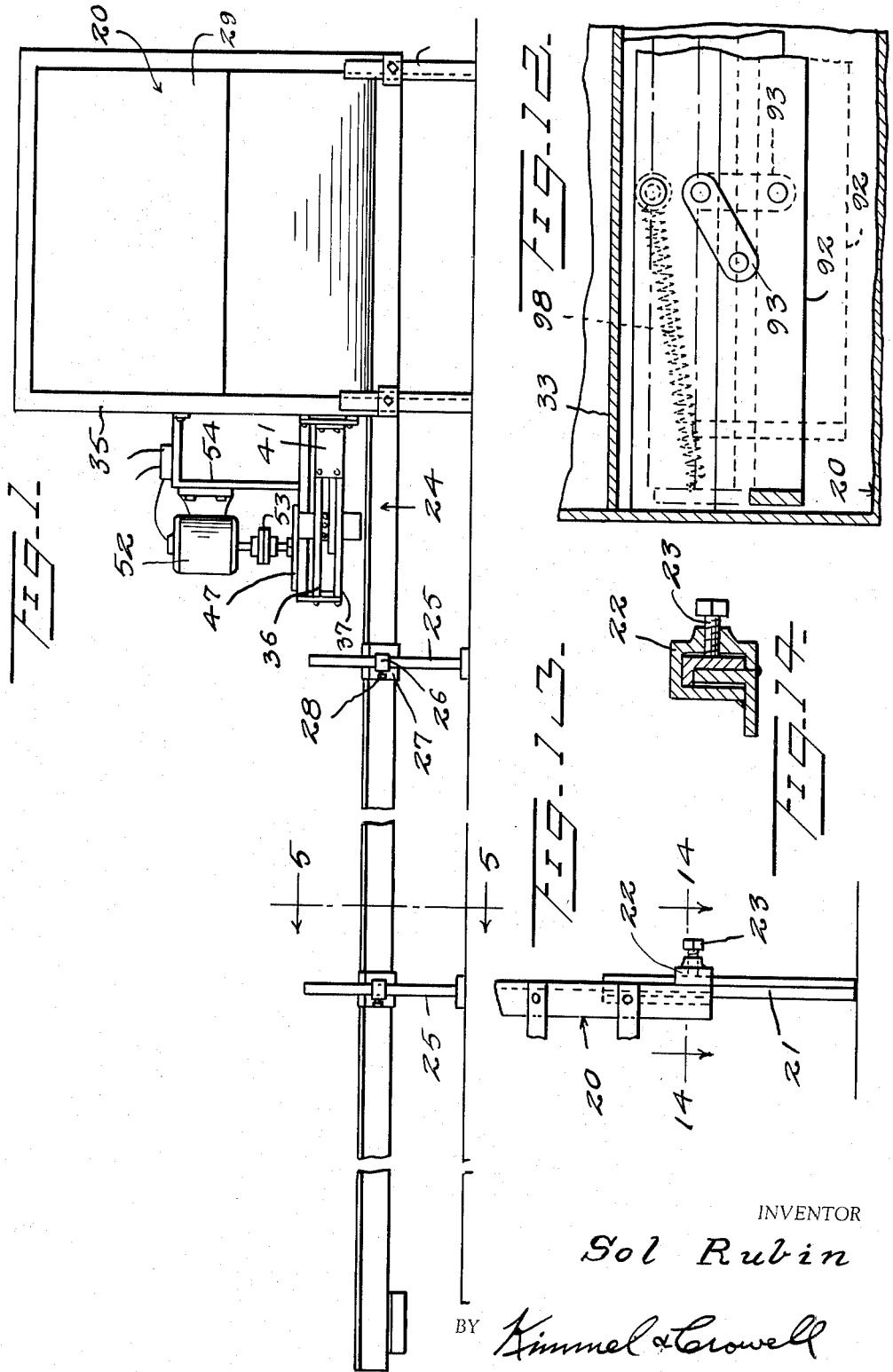
INVENTOR
Sol Rubin
BY Kimmel & Crowell
ATTORNEYS

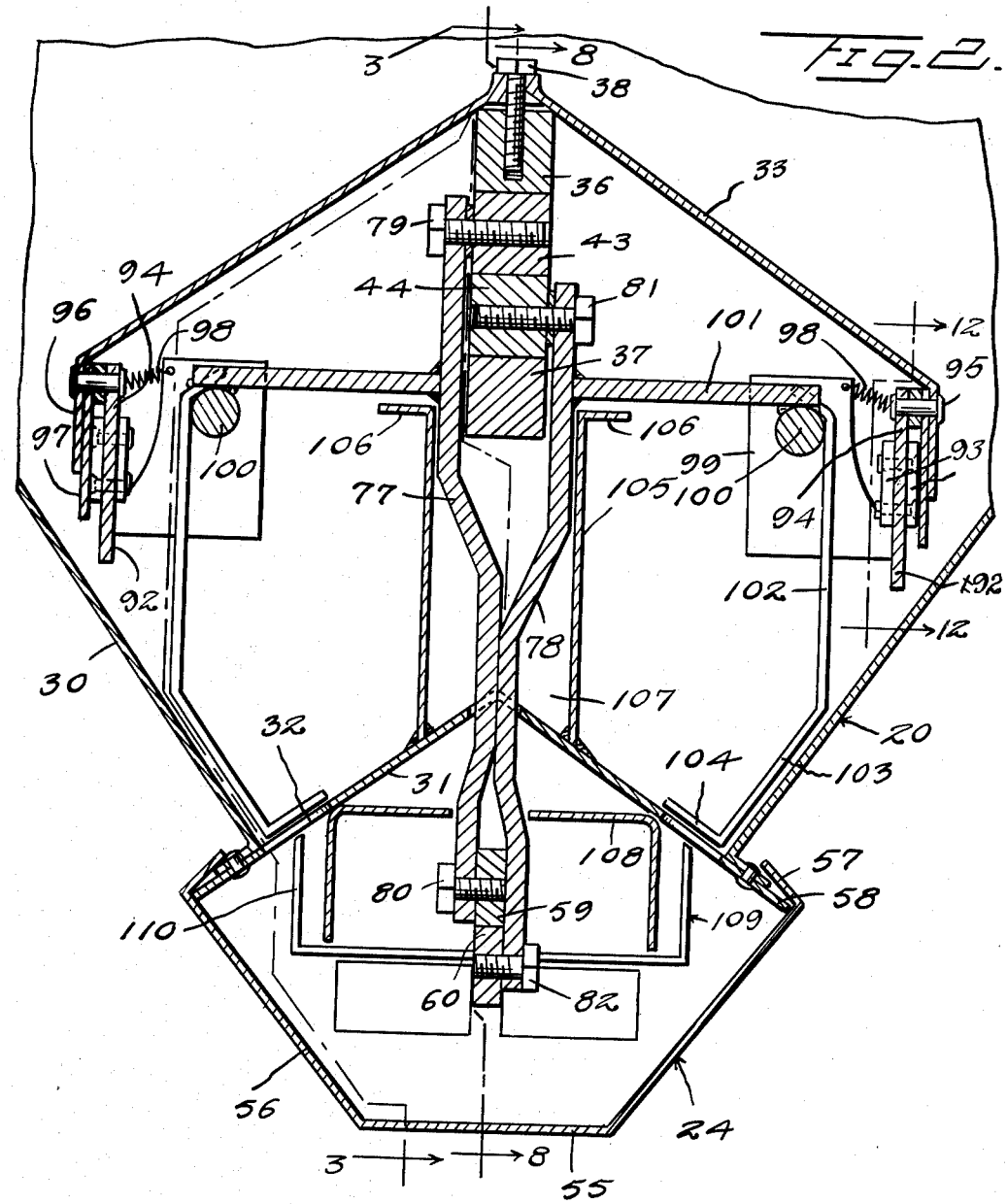

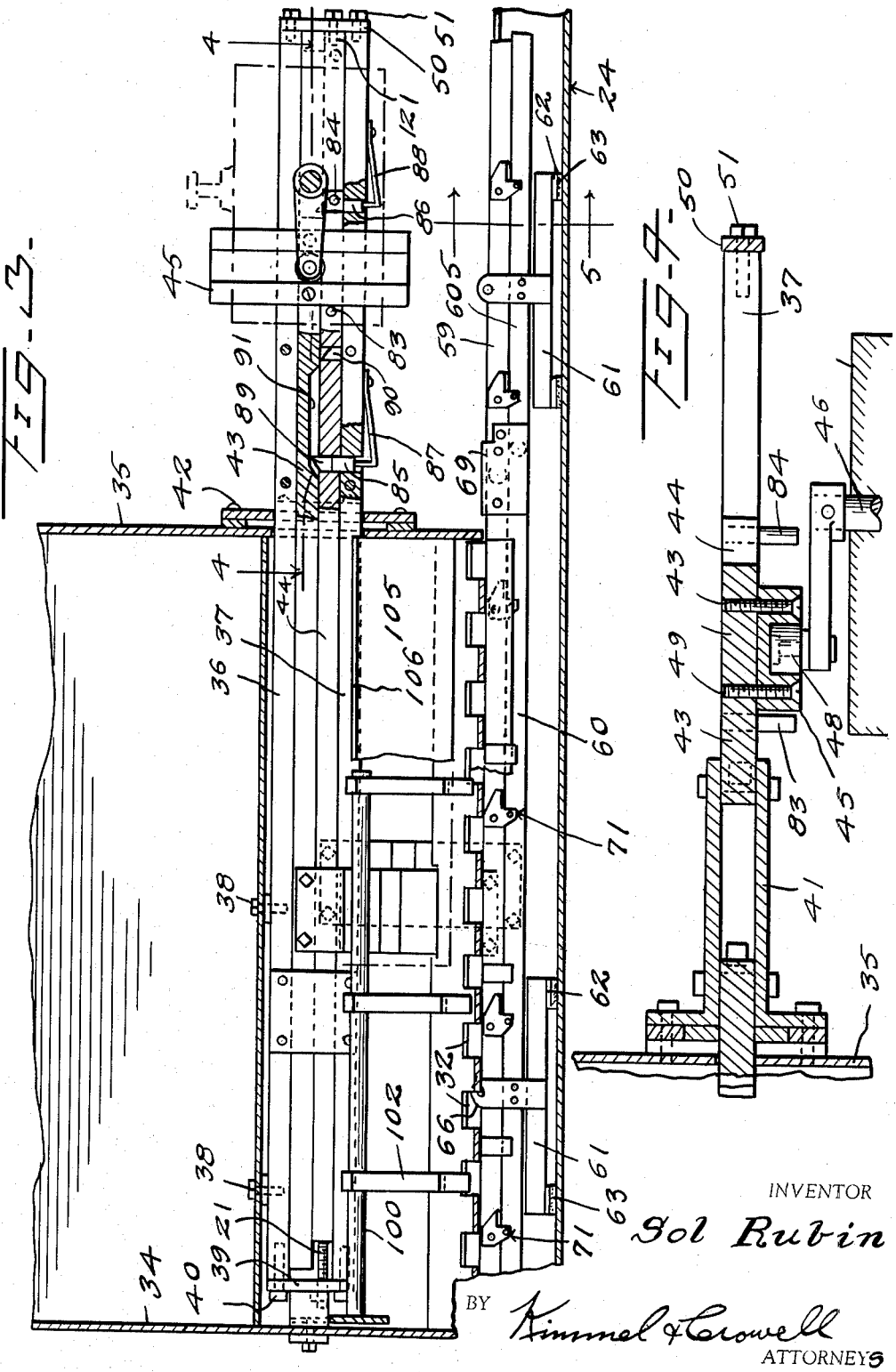

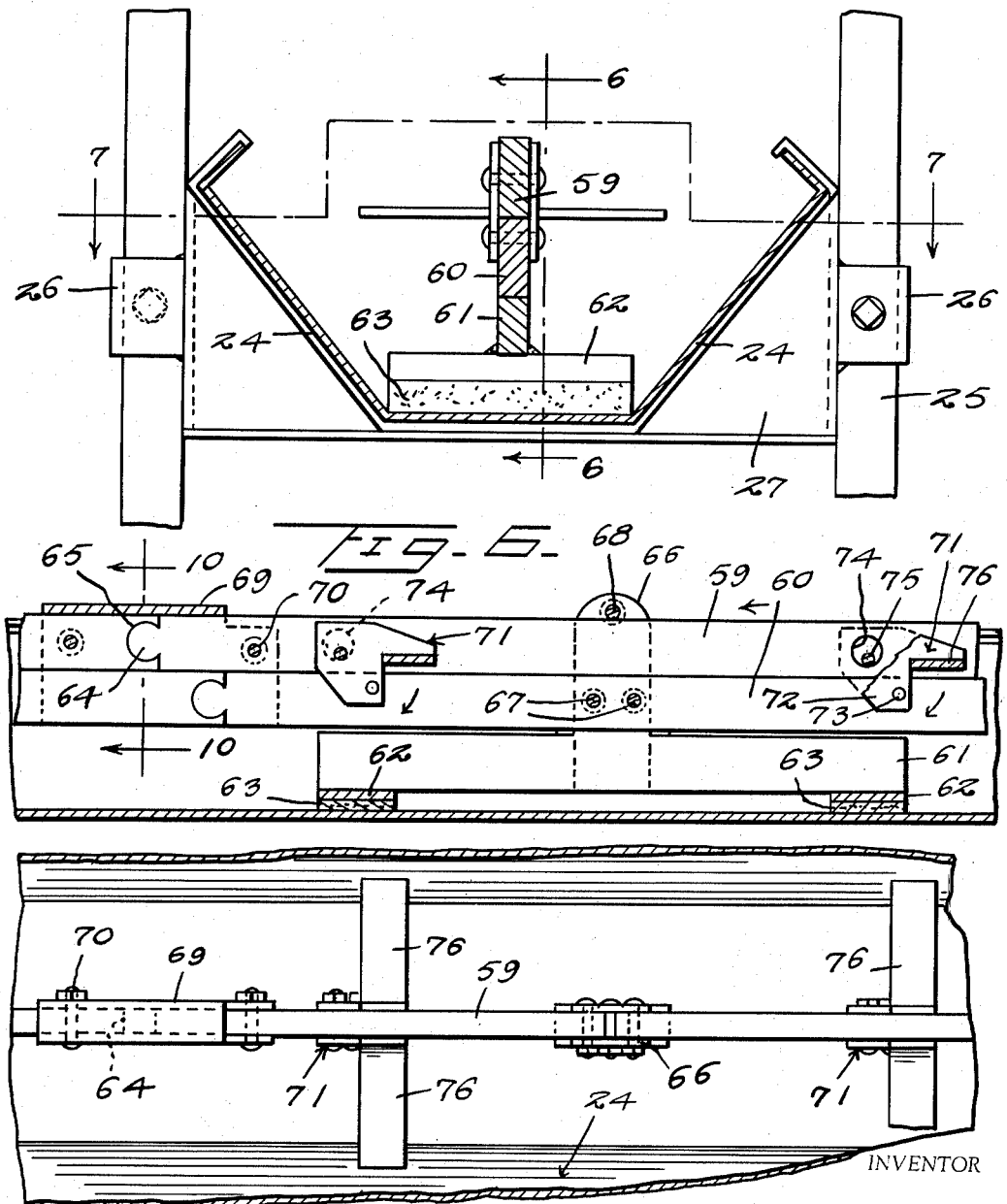

Aug. 9, 1955  S. RUBIN  2,714,950
AUTOMATIC FEEDING DEVICE
Filed Sept. 4, 1952  5 Sheets-Sheet 5
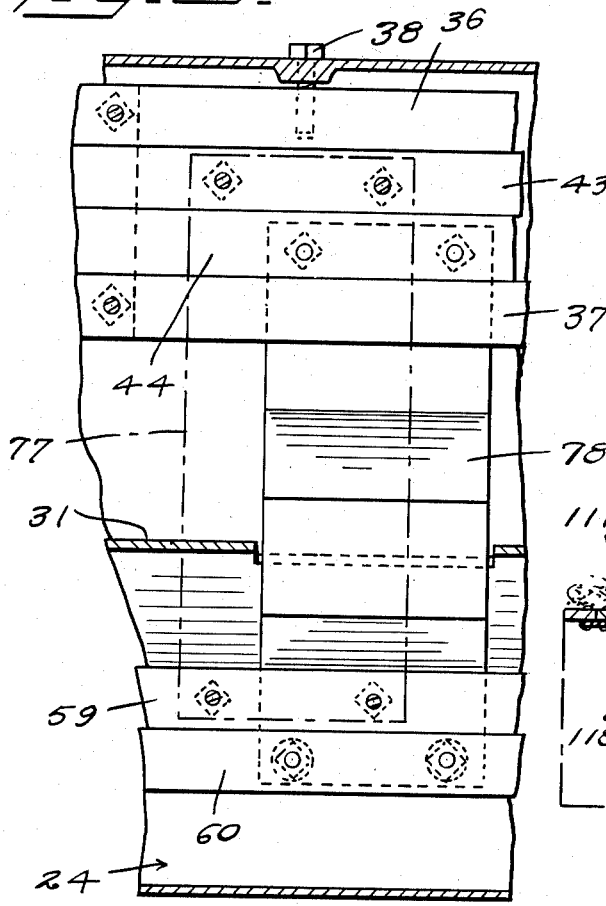
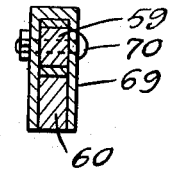
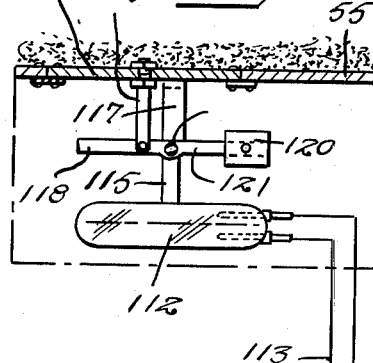
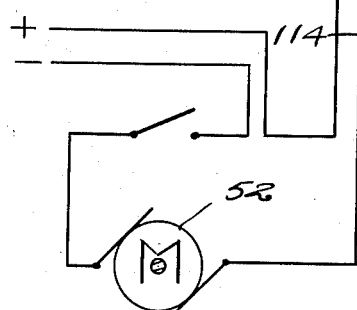
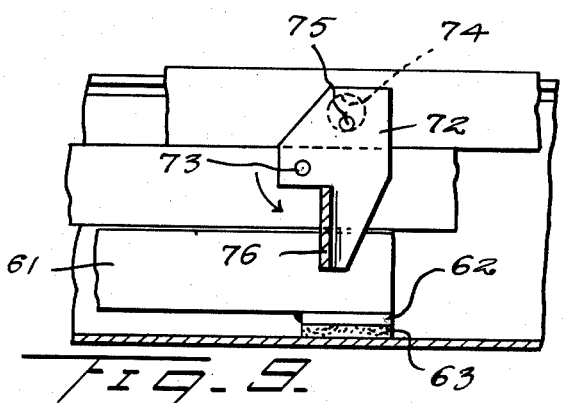
INVENTOR
Sol Rubin
BY Kimmel & Crowell
ATTORNEYS

United States Patent Office 2,714,950
Patented Aug. 9, 1955

2,714,950
AUTOMATIC FEEDING DEVICE
Solomon Rubin, Monmouth, N. J.
Application September 4, 1952, Serial No. 307,807
5 Claims. (Cl. 198—37)

This invention relates to an automatic feeding and/or automatic conveying or conveyor device for poultry or the like.

An object of this invention is to provide a feeding device whereby a predetermined quantity of feed will always be available to poultry.

Another object of this invention is to provide a feeding device embodying a hopper with a feeding trough extending from the hopper, and means operable when the feed in the trough reaches a predetermined low level for automatically filling the trough.

A further object of this invention is to provide an improved reciprocal conveying means for conveying the feed from the hopper to and along the trough so that the fowl feeding from the trough will not be injured and the feed will not be spilled out of the trough, the return or idling stroke of the conveyor serving to level the feed in the trough.

A further object of this invention is to provide a feeding device of this kind wherein the trough may be extended for any desired distance from the hopper.

A further object of this invention is to provide an improved means for swinging the conveyor blades from operative to inoperative position.

A further object of this invention is to provide an improved means for intermittently feeding the material from the hopper to the trough on the return or inoperative stroke of the conveying means.

With the above and other objects in view, my invention consists in the arrangement, combination and details of construction disclosed in the drawings and specification, and then more particularly pointed out in the appended claims.

In the drawings—

Figure 1 is a detailed side elevation, partly broken away, of an automatic poultry feeding device constructed according to an embodiment of this invention, Figure 2 is a fragmentary transverse section through the hopper, Figure 3 is a fragmentary sectional view taken on the line 3—3 of Figure 2, Figure 4 is a fragmentary sectional view taken on the line 4—4 of Figure 3, Figure 5 is a sectional view taken on the line 5—5 of either Figure 1 or Figure 3, Figure 6 is a fragmentary sectional view taken on the line 6—6 of Figure 5, Figure 7 is a fragmentary sectional view taken on the line 7—7 of Figure 5, Figure 8 is a fragmentary sectional view taken on the line 8—8 of Figure 2, Figure 9 is a fragmentary longitudinal section through the trough, showing the conveyor blades in operative or conveying position, Figure 10 is a fragmentary sectional view taken on the line 10—10 of Figure 6, Figure 11 is a diagrammatic view, partly in section, showing the automatic switch for the conveyor operator, Figure 12 is a fragmentary sectional view taken on the line 12—12 of Figure 2, Figure 13 is a fragmentary side elevation of the adjustable legs for the hopper, Figure 14 is a sectional view taken on the line 14—14 of Figure 13.

Referring to the drawings, the numeral 20 designates generally a hopper which is supported by means of vertically adjustable legs 21. The legs 21 are of angle shape and engage in loops 22 and are secured in the loops 22 by means of set screws 23.

A feeding trough generally designated as 24 extends from the hopper 20 and projects therebeneath. The trough 24 is supported by means of legs 25 engaging through keepers or loops 26 which are secured to plates 27, and the legs 25 are vertically adjusted by means of set screws 28. The hopper 20 is formed with vertical side walls 29 and downwardly convergent walls 30, with an inverted V-shaped bottom wall 31, having openings 32. The material, such as feed or the like, is placed within the hopper 20 and this material is regulated as to the flowing thereof through the discharge openings 32, as will be hereinafter described.

An inverted V-shaped baffle 33 extends between the end walls 34 and 35 of the hopper 20, and is firmly secured therebetween. A pair of upper and lower horizontally disposed guide bars 36 and 37 respectively extend through the wall 35, and baffle 33 is secured to the upper guide bar 36 by fastening devices 38. The inner ends of the guide bars 36 and 37 are connected together by means of a connecting bar 39 which is secured to the guide bars 36 and 37 by fastening devices 40.

The guide bars 36 and 37 project from the end wall 35 which is the front end wall, and are secured to the end wall 35 by means of angle-shaped plates 41 which are secured by fastening means 42 to the front end wall 35. A pair of conveyor operating slide bars 43 and 44 are disposed between the guide bars 36 and 37, and bar 43 has fixed to the end thereof projecting from the hopper 20, a vertically disposed channel member 45.

A crankshaft 46 connected with a gear reduction unit 47 of conventional construction has the crank pin 48 thereof slidably disposed in the channel of channel member 45 so that rotation of the crankshaft 46 will effect reciprocation of slide bar 43. Channel member 45 is secured to slide bar 43, as shown in Figure 4, by means of fastening devices 49. The outer ends of the guide bars 36 and 37 are connected together by means of a connecting bar 50 which is secured by fastening devices 51.

The gear reduction unit 47 is connected with an electric motor 52 by means of a clutch 53. The clutch 53 is of conventional construction. The motor 52 is supported from the front end wall 35 by means of a U-shaped bracket 54.

The trough 24 is formed with a horizontal bottom wall 55 and upwardly divergent side walls 56. The upper edges of the side walls 56 have inwardly projecting flanges 57. The flanges 57 engage over downwardly divergent flanges 58 which are formed integral with the hopper bottom 31, and project outwardly from the convergent walls 30 of hopper 20.

The trough 24 has slidably mounted lengthwise thereof, upper and lower conveyor bars 59 and 60, and bar 60 slidably engages a horizontally disposed guide bar 61 which has opposite end plates or base members 62 secured thereto. The base members 62 are secured, as by cement or the like, to rubber cushion members 63 which are cemented or otherwise secured to the bottom 55 of trough 24. The bars 59 and 60 are of an extensible characteristic and each bar is formed at one end thereof with a key 64 engaging in a keeper 65 carried by the opposite end of an adjacent conveyor bar. By providing the key and keeper at the ends of the conveyor bars, these bars may be extended as may be desired, depending on the length of the trough 24.

The bars 59 and 60 are held in edgewise contact by means of pairs of plates 66 which engage on the opposite sides of bars 59 and 60, and the guide bar 61. The plates 66 are secured to the lower conveyor bar 60 by fastening devices 67, and a fastening member or pin 68 is secured between the plates 66 and engages over the upper edge of conveyor bar 59. The joint between the upper conveyor bars 59 formed by the key 64 and keeper 65, is held against disconnection by means of an inverted U-shaped securing member 69 which is secured by fastening devices 70 to the upper conveyor bar 59. The U-shaped member 69 overlaps the sides of the lower conveyor bar 60 so that the adjacent joints of the connected bars 60 will be held against lateral movement.

The conveyor bars 59 and 60 have rockably mounted on the opposite sides thereof spaced apart pairs of conveyor blade members generally designated as 71. The blade members 71 are formed of a vertical base plate 72 through which a pivot pin 73 engages and the pin 73 engages through the lower conveyor bar 60. The upper bar 59 is formed with a relatively large opening 74 and a connecting pin 75 extends through the base members 72 and through the opening 74. Each base plate 72 has projecting therefrom a conveyor blade 76 which is adapted on the outward movement of the conveyor bars 59 and 60 to be disposed in a vertical position, as shown in Figure 9, and on the return stroke of the conveyor bars 59 and 60 the blades 76 are disposed in a horizontal idling or inoperative position, as shown in Figure 6.

The conveyor driving bars 43 and 44 are connected with the conveyor bars 59 and 60 by means of plates 77 and 78. Plate 77 is secured by fastening devices 79 to driving bar 43 and is secured by fastening members 80 to upper conveyor bar 59. Plate 78 is secured by fastening devices 81 to driving bar 44 and is secured by fastening devices 82 to lower conveyor bar 60.

Bar 44 has secured thereto a pair of outwardly projecting stop pins 83 and 84 so that channel member 45 will have lost motion for a predetermined distance relative to driving bar 44. The lost motion between driving bar 44 and channel member 45 is provided so that the conveyor members 71 will be rotated from an operative to an inoperative position, and then back to an inoperative position. The movement of bar 43 relative to bar 44 is accomplished by providing a pair of spaced apart locking members 85 and 86 which are vertically slidable in lower guide bar 37 and are constantly urged upwardly to locking position by means of springs 87 and 88 respectively. The lower driving bar 44 has slidable therein a pair of lock releasing members 89 and 90, as shown in Figure 3, and when the driving bars 43 and 44 are at either end of the stroke thereof, locking members 85 and 86 will in sequence be moved upwardly to push release members 89 and 90 upwardly into a channel or cutout 91 which is formed in the lower edge of driving bar 43.

As shown in Figure 3, driving bar 43 is at the end of its return or inoperative stroke relative to the conveyor bars, and also driving bar 44 is locked relative to the lower guide bar 37. Movement of driving bar 43 to the right, which is the conveying stroke or movement, will effect downward movement of releasing member 89 so as to move locking member 85 downwardly to a released position. When locking member 85 is in its released position, the two driving members 43 and 44 may move together as a unit. At this time channel member 45 will be contacting with stop member 84, and conveyor blades 76 will be disposed in an operative position, as shown in Figure 9.

When the conveyor bars 59 and 60 are at the outer end of their conveying stroke, locking member 86 will be moved upwardly by spring 88 and will push release member 90 upwardly into cutout 91 which at this time will be disposed over the release member 90. On the return stroke, channel member 45 will initially move with driving member 43 without movement of driving member 44, until channel member 45 contacts stop pin 83, and at this time release member 90 will be moved downwardly entirely within driving member 44 and will push locking member 86 downwardly so that driving member 44 may move with driving member 43.

In order to provide for regulated feeding of the material from the hopper 20 through the discharge openings 32 into the trough 24, I have provided a pair of elongated vertically disposed valve members or plates 92 which are secured by shackles or links 93 to a second elongated and vertically disposed plate 94. Plate 94 is secured by fastening members 95 to a depending flange or skirt 96 which extends from the outer edges of the baffle 33. A plate 97 is also secured in dependent relation between the skirt 96 and the shackles 93 so as to relieve the valve member 92 of the weight of material which is flowing beneath the lower edges of the flanges or skirts 96.

The valve members 92 in their upper or open position are adapted to abut at their upper edges against the lower edges of the plates 94. The valve members 92 are constantly urged to a closed position in substantial contact with the walls 30, by means of springs 98 which are connected between the end fastening members 95 and right angularly disposed and inwardly projecting bumper plates 99 which are secured to the rear ends of the valve members 92. These valve members 92 are held in open position only for a short time, which time is at the end of the return stroke of the driving bars 43 and 44.

The valve members 92 are moved to an open position by means of a pair of horizontally disposed rods 100 which are carried by laterally projecting supporting bars 101 projecting from the plates 77 and 78.

In order to prevent the feed from packing up on the bottom wall 31, and in order to provide for free flowing of the feed through the openings 32, I have provided a plurality of downwardly projecting fingers 102 which are secured to the bars 100 and are formed with extensions 103 parallel with the walls 30. The extensions 103 terminate in right angular extensions 104 which are parallel with the bottom 31, as shown in Figure 2.

The inverted V-shaped baffle 33 has mounted therebelow a pair of vertically disposed channel forming plates 105 formed with right angular upper flanges 106. The plates 105 form a channel or tunnel 107 within which the connecting plates 78 and 79 slidably engage so that these plates 78 and 79 will not be obstructed by any feed which will collect below the baffle 33 and on the upper side of the bottom 31.

An inverted U-shaped baffle 108 is secured to the lower side of the bottom 31 inwardly from the openings 32 so that the downward flowing material will be directed downwardly and outwardly into the trough 24. The lower conveyor bar 60 has secured thereto within the trough 24, and below the inverted baffle 108, a plurality of U-shaped fingers 109. These fingers 109 have vertical sides 110 extending upwardly toward the discharge openings 32 and on the outer sides of the baffle 108.

In order to provide a means whereby the power member or motor 52 will be automatically operated so as to maintain the trough 24 substantially filled, I have provided a flexible diaphragm 111 which is mounted in the outer end of the bottom 55 of the trough 24. A liquid switch 112 is connected by conductors 113 and 114 to the motor 52, and switch 112 is dependingly carried by an L-shaped lever 115 rockably carried by a pivot 116. The pivot 116 is carried by depending brackets 117 which are secured relative to the bottom 55 of the trough 24. The upper horizontal arm 118 of the lever 115 is connected with the diaphragm 111 by means of a connecting member 119.

A counterbalancing weight 120 is secured to extension 121 projecting oppositely from the arm 118. The diaphragm 111 is normally flexed upwardly by the weight 120 so as to normally rock switch 112 to a circuit closing position. When the material in the trough 24 overlies the diaphragm 111 to a depth wherein the trough is substantially filled, the weight of this material overlying the diaphragm 111 will force this diaphragm downwardly and switch 112 will be rocked to a circuit breaking position.

In the use and operation of this automatic feeding device the material is placed in the hopper 20 and assuming that there is little or no feed overlying the diaphragm 111, switch 112 will be rocked to a circuit closing position. At this time motor 52 will be operated and driving bars 43 and 44 will be reciprocated by rotation of crankshaft 46. At each reciprocation of the conveyor bars 59 and 60 the material in the trough 24 will be moved forwardly step-by-step and on the return stroke of the bar 44 with bar 43, valve members 92 will be moved upwardly to an open position whereby feed from the hopper 20 may flow downwardly into the trough 24. This feeding device will provide for maintaining an adequate supply of feed in the trough 24 and if the feed should be initially removed from the outer end of trough 24 so that diaphragm 111 may be flexed upwardly so as to rock switch 112 to a circuit closing position, the motor 52 will only be operated for a sufficient time to move material already in the trough 24 to an overlying position relative to the diaphragm 111.

An adjustable stop screw 121 is disposed at each end of the guide bars 36 and 37 for engagement by bar 44 to prevent distortion of the locks 85 and 86 and to eliminate play in channel member 45.

I do not mean to confine myself to the exact details of construction herein disclosed, but claim all variations falling within the purview of the appended claims.

What I claim is:

1. An automatic feeding means comprising a hopper, a trough extending from said hopper, a pair of vertically aligned elongated bars disposed in and extending lengthwise of said trough, oppositely disposed pairs of conveyor blades pivotally connected to both of said bars, means simultaneously reciprocating both said bars, means active at the start of one stroke of said bars for moving one bar relative to the other bar to thereby swing said blades to a vertical conveying position, and means active at the start of the return stroke of said bars for moving one bar relative to the other bar to thereby swing said blades to a horizontal inoperative position.

2. An automatic feeding means comprising a hopper, a trough extending from said hopper, a pair of vertically aligned elongated bars disposed in and extending lengthwise of said trough, oppositely disposed pairs of conveyor blades each pivotally connected to both said bars, means simultaneously reciprocating both said bars, means active at the start of one stroke of said bars for moving one bar relative to the other bar to thereby swing said blades to a vertical conveying position, means active at the start of the return stroke of said bars for oppositely moving said one bar relative to the other bar to thereby swing said blades to a horizontal inoperative position, and means carried by said trough connected to said operating means and disposed in said trough remote from said hopper for activating said operating means when the trough is substantially empty, said latter named means rendering said operating means inoperative when the trough is substantially filled.

3. An automatic feeding means comprising a hopper, a trough extending from said hopper, a reciprocal conveyor in said trough formed of a pair of vertically aligned elongated bars, means carried by said bars supporting said bars for sliding movement relative to said trough, means slidably connecting said bars together, an operator connected with one of said bars, oppositely extending pairs of conveying blades pivotally connected between said pair of bars, and spring-pressed locking means carried partly by the other one of said bars and partly by said trough for locking the other one of said bars against movement relative to said trough at the end of each stroke, said one bar being formed to effect release of said locking means upon initial movement of said one bar at the beginning of each stroke to thereby rock said blades to operative or inoperative position.

4. An automatic feeding means comprising a hopper, a trough extending from said hopper, a reciprocal conveyor in said trough, said conveyor comprising upper and lower elongated bars disposed in edgewise position, a guide rail carried by said trough engaging the lower one of said bars, oppositely disposed pairs of conveyor blades, means rockably securing said blades to said upper and lower bars, a pair of driving bars parallel with said first named bars, a pair of connecting plates connected one between a driving bar and an elongated bar, means for reciprocating one of said driving bars, and a last motion connection between said one driving bar and the other driving bar whereby said one driving bar will initially move independently of the other driving bar at the start of the movement in each direction to thereby move said upper and lower elongated bars relative to each other whereby to rock said blades to operative or inoperative position.

5. An automatic feeding means comprising a hopper, a trough extending from said hopper, a reciprocal conveyor in said trough, said conveyor comprising upper and lower elongated bars disposed in edgewise position, a guide rail carried by said trough engaging the lower one of said bars, oppositely disposed pairs of conveyor blades, means rockably securing said blades to said upper and lower bars, a pair of driving bars parallel with said first named bars, a pair of connecting plates connected one between a driving bar and an elongated bar, means for reciprocating one of said driving bars, guide means for said driving bars, a pair of spring-pressed locking members carried by said guide means, said other driving bar having a pair of keeper openings adapted for alternate registry with said locking members, a pair of releasing pins loosely carried by said other driving bar in said keeper openings, said one driving bar having a cut out within which a releasing pin engages whereby said other bar will be locked relative to said guide and said one driving bar may move independently of said other driving bar to thereby effect rocking of said conveying blades to operative or inoperative position, and a pair of spaced stop pins carried by said other driving bar whereby said other driving bar will move with said one driving bar after initial independent movement of said one driving bar.

References Cited in the file of this patent

UNITED STATES PATENTS

| | | |
|---|---|---|
| 245,155 | Gochnauer | Aug. 2, 1881 |
| 986,877 | Torrey | Mar. 14, 1911 |
| 1,445,628 | Koenig | Feb. 20, 1923 |
| 2,043,595 | Raymond | June 9, 1936 |
| 2,270,083 | Rapp | Jan. 13, 1942 |
| 2,475,404 | Reed | July 5, 1949 |
| 2,553,719 | Palmer | May 22, 1951 |

FOREIGN PATENTS

| | | |
|---|---|---|
| 391,935 | Great Britain | May 11, 1933 |
| 432,879 | Great Britain | Aug. 6, 1935 |